Sheet 1 - 6 Sheets.

I. Adams.

Printing Press.

RX N°116.

Reissued Jun. 13, 1848.

9445X RELATED DOC

I. Adams.
Sheet 2 - 6 Sheets.
Printing Press.
RX No. 116. 9445X
Reissued Jun. 13, 1848.
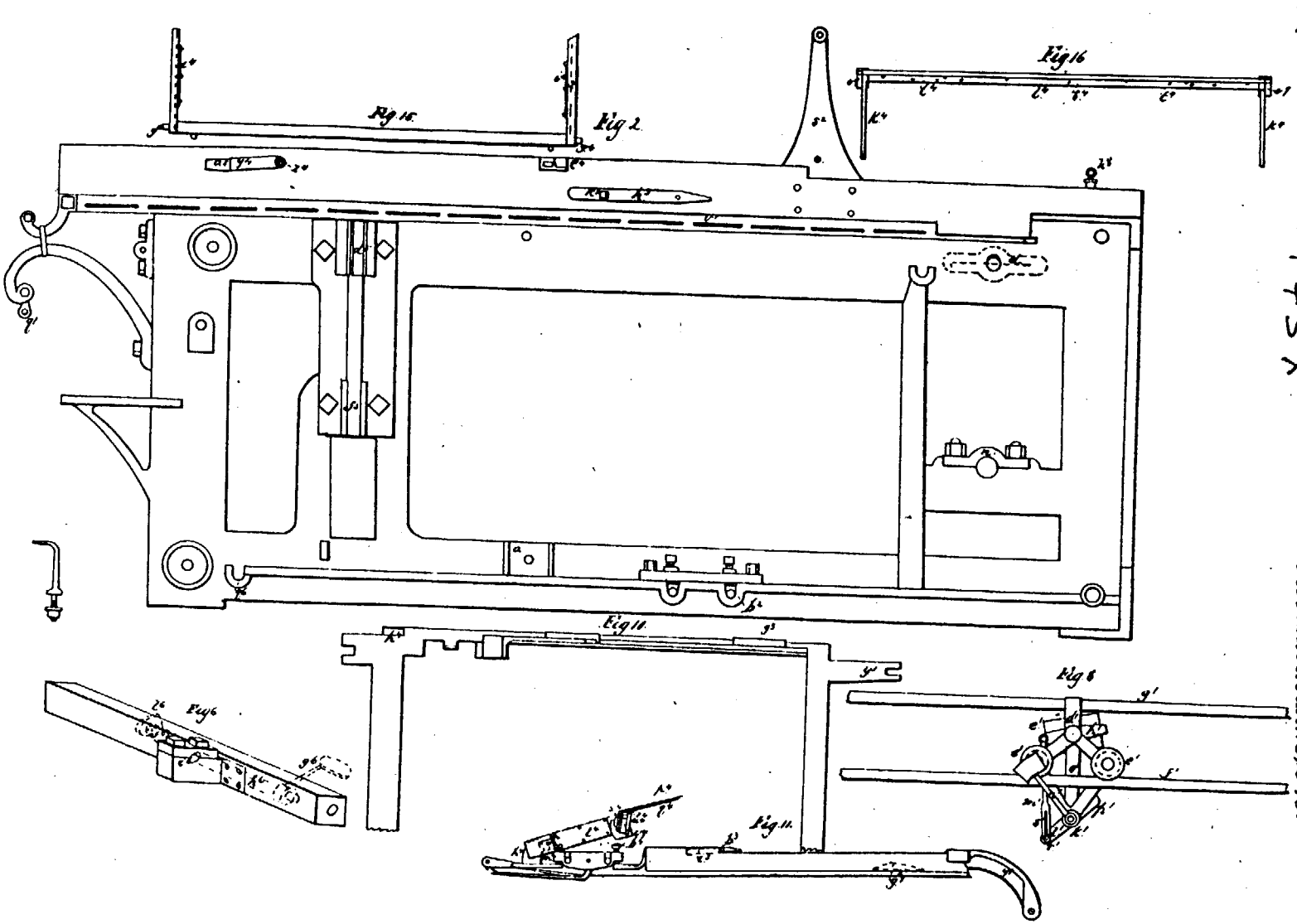

Sheet 3 - 6 Sheets.
I. Adams.
Printing Press.
RX No. 116. 9445 X
Reissued Jun. 13, 1848.
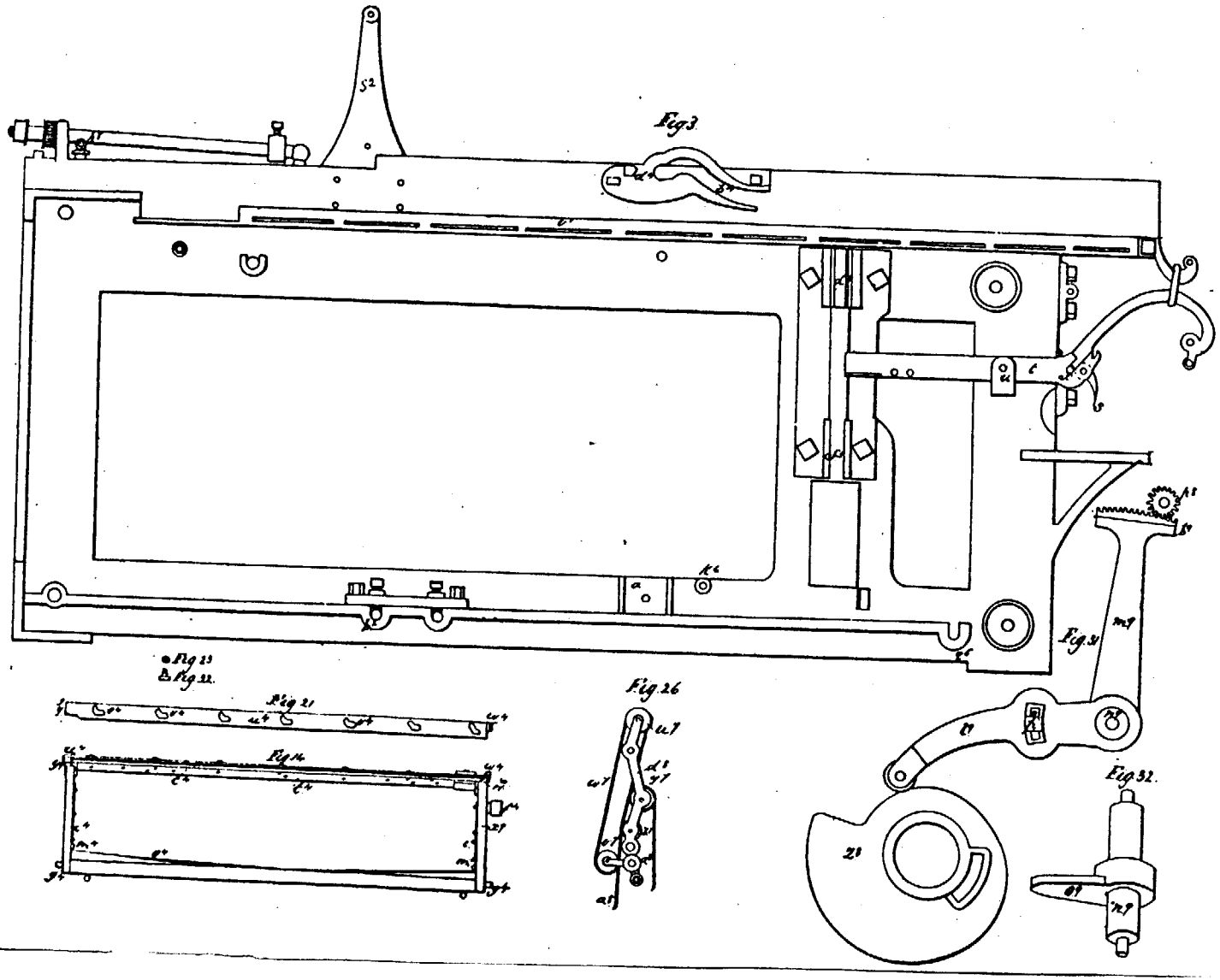

Sheet 4 - 6 Sheets.

I. Adams.

Printing Press.

Rx No. 116. 9445 X

Reissued Jun. 13, 1848.

Sheet 5-6 Sheets.

I. Adams.
Printing Press.

RX No. 116. 9445 X

Reissued Jun. 13, 1848.

Sheet 6-6 Sheets.
I. Adams.
Printing Press.
Rx No. 116. 9445X
Reissued Jan. 13, 1848.
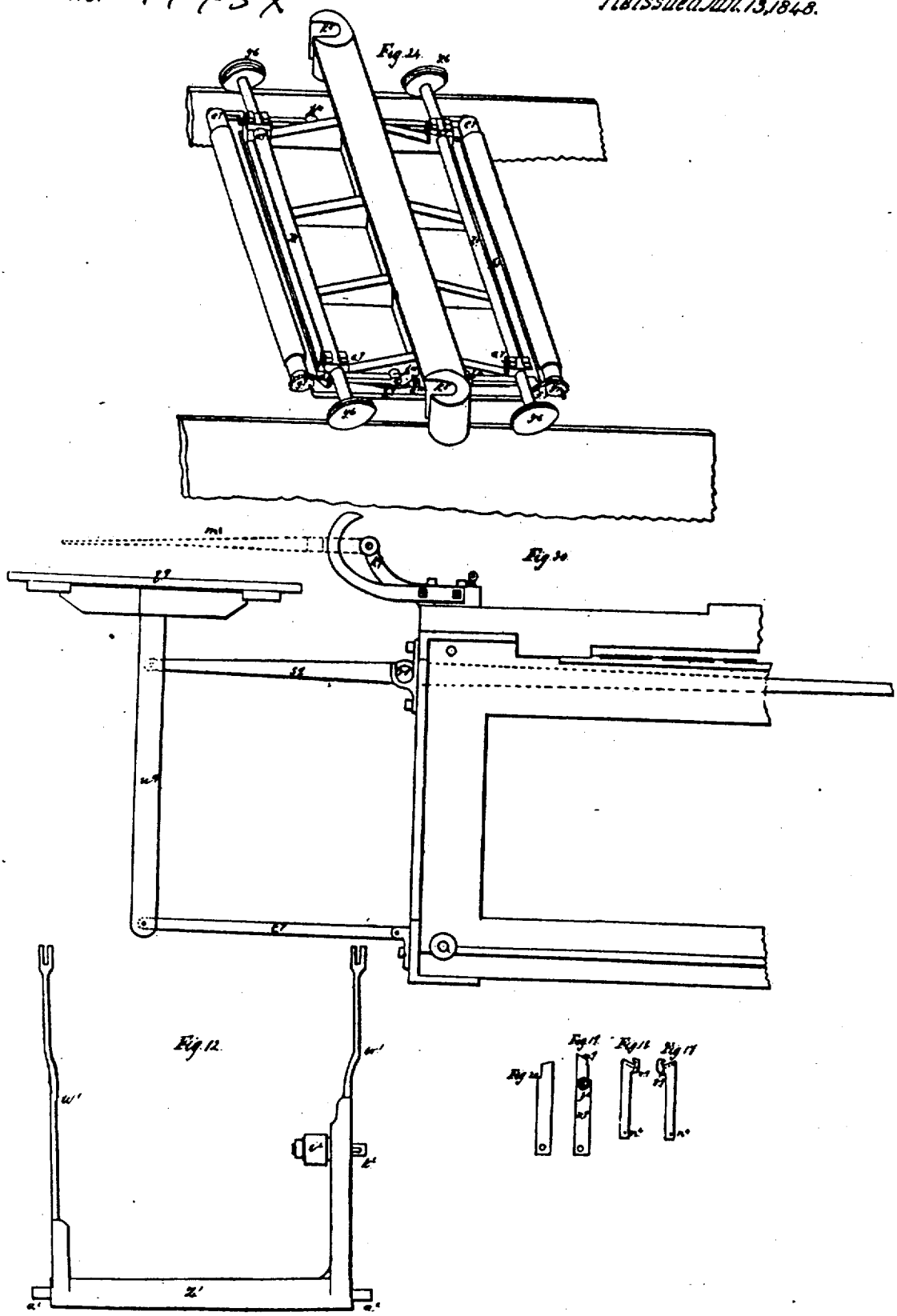

UNITED STATES PATENT OFFICE.

RX116

ISAAC ADAMS, OF BOSTON, MASSACHUSETTS.

IMPROVEMENT IN POWER PRINTING-PRESSES.

9445X RELATED DOC

Specification forming part of Letters Patent dated March 2, 1836; Reissue No. 116, dated June 13, 1848.

*To all whom it may concern:*

Be it known that I, ISAAC ADAMS, of Boston, in the county of Suffolk and State of Massachusetts, have invented certain new and useful Improvements in Machinery for Printing; and I do hereby declare that the same is fully described and represented in the following specification and accompanying drawings, letters, figures, and references thereof.

The printing-machine embodying my invention may be described as made up of five different systems or aggregations of parts, each system being used for the performance of a distinct part of the process of printing—to wit, first, the distribution of the ink; second, pointing the sheets on the feed-board or tympan; third, taking the sheets from the feed-board and conveying them in between the platen and form of types; fourth, producing the impression, and, fifth, removing the sheets from the press and laying them on the pile or a table or other convenience provided for the purpose, each system being so calculated and arranged within itself, and so arranged and combined with all the others, that while each performs its office in a distinct and complete manner successively they all receive their appropriate motions from the same motive agent, and though some parts are in constant operation, while other parts move and stop alternately, the said systems severally complete the performance proper to each of them in consecutive order.

Figure 1:
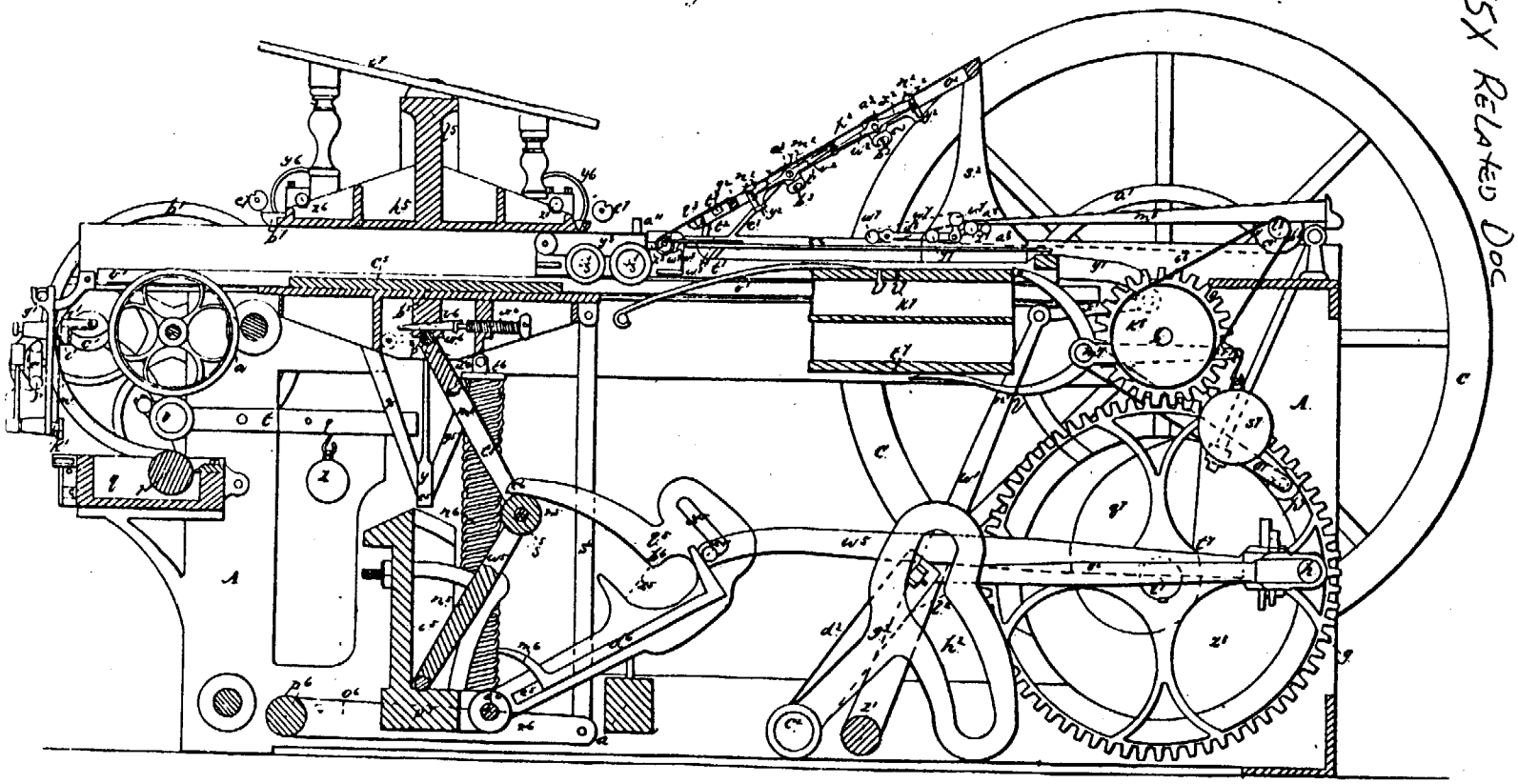
Figure 4:
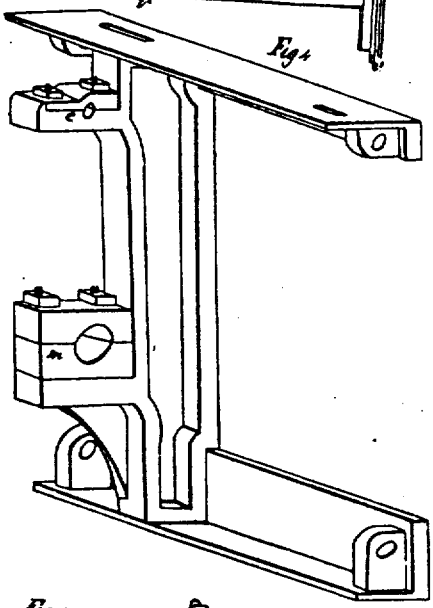
Figure 5:
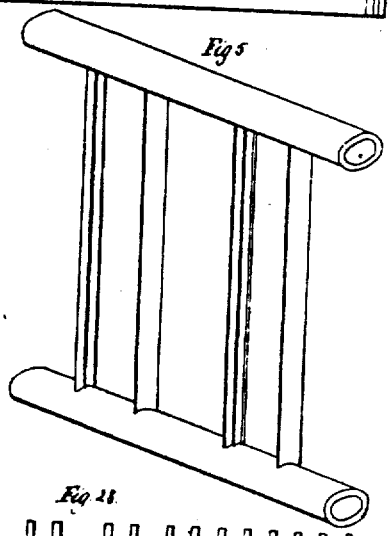

Figure 1 is a sectional elevation of the whole machine as it would appear provided the front side piece of the frame could be removed and the several operative parts be made to still maintain their relative working positions. A A, &c., denote the opposite or fly-wheel side of the frame. Fig. 2 exhibits an elevation of the inner face of the same part of the frame as it appears when separated from most of the operating parts of the machine. Fig. 3 denotes an inside view of the front side piece of the frame. Fig. 4 denotes a projection of the end piece of the right-hand end of the frame. Fig. 5 denotes a projection of the end piece of the left-hand end of the frame, and Fig. 6 denotes a projection of a cross-bar which is secured to the two sides of the frame at *a a*, Figs. 2 and 3. (See a section of said bar at *a*, Fig. 1.) *b* denotes the fly-wheel shaft, from which motion is conveyed to all the moving parts of the machine. (For a side view of this shaft see *b*, Fig. 7.) *c* denotes the fly-wheel. The fly-wheel shaft is sustained in the frame in bearings, one of which is seen at *d*, Fig. 2, and the other at *e*, Fig. 4. The end *f*, Fig. 7, may be supported by any proper bearings affixed to the inside of the front side piece of the frame. The outline of the right-hand end of the machine is exhibited in Fig. 7 by the dotted lines.

*g*, Figs. 1 and 7, denotes a toothed wheel whose office is to carry the crank *h*, and to rotate the shaft *i* and the several pieces secured to said shaft. The shaft *i* runs on the journals *k l*, the former of which runs in the box *m*, attached to the end piece of the frame, and the latter in the box *n* in the side piece of the frame, Fig. 2.

*o*, Figs. 1 and 7, denotes a toothed pinion secured on the fly-wheel shaft, its office being to give rotary motion to the wheel *g*, into which it gears.

*p*, Fig. 7, denotes a handle secured to an arm of the fly-wheel, so as to enable a person to put the machine in motion by hand. Pulleys and bands or other devices may be used to connect the machine with any other power.

The process of distributing the ink is performed by means of a system of rollers, as follows:

*q* denotes a section of the ink-fountain. This is made upon the principle of those in common use, and is principally composed of a trough for the ink, a roller, and a scraper.

*r* denotes the fountain-roller, which is turned in the usual manner by means of a ratchet-wheel on one end of it and a pawl, *s*, Fig. 3, connected to the lever *t*, which is attached by the fulcrum *u* to the side of the frame, Fig. 3.

*v* denotes a feed-roller, which is provided with an elastic composition surface. Its office is to take the ink from the fountain-roller and convey it to the distribution-cylinder *w*. Said feed-roller is suspended by pivots in bearings (one of which is seen at *x*, Fig. 3) on the levers *t t*, Figs. 1 and 3, and it is brought down in contact with the fountain-roller (in order to take from it a portion of ink every time an impression is given) by means of a projection from each of two guide-pieces, (one of which is seen at *y*, Fig. 1,) which are attached to the ends of the bed. Said projections, when the bed is raised up to produce an impression, come up under the ends of the levers *t t*, and, by forcing said ends up, cause the opposite ends, with the roller suspended on them, to move down until said roller is brought into contact with the fountain-roller, which imparts to it, along its whole length, a small quantity of ink. When the bed is lowered down, the weights of the levers *t t* (one of which weights is seen at *z*, Fig. 1) cause the feed-roller to rise up and come in contact with the distribution-cylinder *w*, upon the surface of which the ink thus taken from the fountain will afterward be distributed by the rolling together of the peripheries of said cylinder and said roller. The cylinder *w* should be sustained by its journals in boxes so attached to the ends of the two side pieces of the frame, Figs. 2 and 3, as to be adjustable vertically by means of slots or otherwise. The said cylinder receives constant rotary motion from the fly-wheel shaft by means of an endless band, which runs over the pulleys *a'* on the fly-wheel shaft and *b'* on the shaft of the cylinder.

In order to make a perfect distribution of the ink from end to end over the surface of the cylinder *w*, a short roller, *c'*, (see both Figs. 1 and 3, the latter figure being a rear elevation of it and the parts adjacent to it,) is made to travel from end to end of said cylinder alternately. The surface of the said traveling roller is composed of an elastic composition such as that in common use for making distribution-rollers of printing-machines, and it is made to travel in a lateral direction on the surface of the cylinder by being held against it with its axis in an angular direction to the axis of the cylinder while said cylinder is revolving. The effect of this is to cause the traveling roller to gradually approach one end of the cylinder until its inclination is inverted, which taking place said roller will travel toward the other end of the said cylinder.

*d'* denotes the frame of the carriage, to which the traveling roller is attached.

*e' e'* are wheels or friction-rollers, on which the said frame rests.

*f'* is a horizontal transverse rod, on which the carriage travels, and *g'* denotes a similar rod, which serves to keep the carriage in its proper position.

The traveling roller revolves on a small rod or axle in a frame, *h'*, which is secured to the end of a spindle or rocker-shaft, *i'*, which rocker-shaft rests in a bearing formed by a hole made through the frame *d'*.

*k'* denotes another spindle or rocker-shaft, resting in another bearing formed by another hole made through the lower part of said frame. To the end of this spindle is secured a cross-piece, *p'*, one end of which is connected to one end of the roller-frame by means of the connecting-rod *m'*.

*n'* is a weighted lever, which is attached to the end of the rocker-shaft *k'*.

*o'* is a flat spring, which is secured to the frame *d'* by its lower end, while its upper end is made to bear against a collar or shoulder on the rocker-shaft *i'*. Its use is to press the traveling roller against the cylinder *w*.

The diagonal or oblique bearing of the traveling roller against the cylinder *w* is successively changed, as follows: Supposing the cylinder *w* to be in motion and the traveling roller to be in contact with it, as shown in the drawings, Fig. 1, the said traveling roller will advance toward one end of the cylinder until it shall have approached near to it, when the lever *n'* will be brought in contact with a projection which proceeds from the lower part, *q'*, Fig. 2, of the scroll, which supports the parallel rods, *f' g'*, and is near the said end of said cylinder. The said projection, by means of the continued advancement of the traveler toward and against it, elevates the said weighted lever *n'* and forces it over, so as to throw its center of gravity on the opposite side of the rocker-shaft *k'*, to which it is attached. The said weighted lever in falling over will turn said rocker-shaft in its bearing, and by so doing will elevate the cross-piece *l'*, and so as to carry the pin or screw *r'*, which goes through the slot *s'*, Fig. 8, made through the connection-rod *m'*, in contact with the upper end of the said slot, and thereby raise the connecting-rod *m'* and the end or part of the frame of the roller *c'*, and reverse the angular position of the said roller, whereby it will be caused, by the rotation of the cylinder *w*, to travel toward the other end of the said cylinder. Having reached the said end, the said weighted lever will meet another projection from the opposite scroll, which supports the opposite ends of the said parallel rods *f' g'*. Said projection will in its turn reverse the position of the said weighted lever and the traveling roller, or move the same back again into their original positions.

The distribution-cylinder *w* may be made of wood; or it may be constructed of metal and be hollow and tight, so as to be capable of holding water or steam. It may be provided with a faucet or some other equivalent, through which cold or heated water may be introduced into said cylinder; or it may have a pipe and cock, or their equivalents, which pipe may be connected with the interior of said cylinder by means of a hole made through the shaft thereof. Through said pipe steam, instead of hot water, may be introduced into the cylinder. By these means the temperature of the ink and the distribution-rollers may be regulated. Two or more cylinders may be used instead of the said cylinder. The ink, being thus properly distributed over the surface of the cylinder *w*, is transferred by the said cylinder to the elastic composition surfaces of

9445X one, two, or more rollers, $s'$ $s'$, which are made to transfer the same to the printing-surface of the forms of types $c^3$. The said two rollers $s'$ $s'$ are suspended in the usual manner by their journals, which are made to run in boxes properly fixed to the front part of a sliding frame, $t'$, which I call the "frisket-carriage." Fig. 9 denotes a top view of said carriage, the roller-boxes, and certain other parts attached to it, (see also Figs. 10 and 11,) which are respectively a top and side view of one-half of a frisket-carriage having certain other parts, to be hereinafter described, attached to it.

$v'$ $v'$, Figs. 1, 2, and 3, denote rails having grooves in their top sides. The said rails are secured to the inner sides of the press-frame, their said grooves being for the frisket-carriage to slide in. When the impression is being produced, the position of the frisket-carriage is such as to bring the rollers $s'$ $s'$ in a central position on the cylinder $w$, whereon they lay and roll in contact with said cylinder during most of the time that the bed is in the act of rising and falling. By this means the ink is evenly communicated from said cylinder to the whole surfaces of the rollers $s'$ $s'$, the said rollers, by means of a proper movement of the frisket-carriage, being afterward caused to roll entirely over the form of types, first from left to right, and next back again to their places on the distribution-cylinder $w$, thus rolling twice over the form. This motion of the frisket-carriage and the parts attached to it is produced by means of the vertical levers or arms $w'$ $w'$, (see Figs. 1 and 12,) which are attached to it by means of two connecting-rods, $x'$, that are properly jointed to said arms and to the arms projecting from said carriage, as seen at $y'$ $y'$ in Figs. 1 and 9. The said arms or levers $w'$ $w'$ proceed upward from near each end of a transverse rocker-shaft, $z'$, which is supported in the machine by gudgeons $a^2$ $a^2$, Fig, 12, which are supported in bearings $b^2$ $b^2$, Figs. 2 and 3, made on the inner surfaces of the two side pieces of the frame.

$c^2$, Fig. 1, denotes another rocker-shaft which lies parallel to the one just described, and rests in bearings on the inside surfaces of the frame in the same manner as those represented at $b^2$ $b^2$.

From near the middle of the shaft $c^2$ an arm or lever, $d^2$, proceeds upward, and is connected by means of the connecting-rod or shackle-bar $e^2$ (see Fig. 1) and proper joints to the crank-pin $h$, which projects from the side of the toothed wheel $g$. It may be seen that the crank-pin $h$ stands off sidewise somewhat from the crank-pin $f^2$. This is for the purpose of timing the motion produced by the crank $h$ with that produced by the crank $f^2$.

$g^2$, Fig. 1, denotes an instrument which I call an "alternator." It is fixed to the rocker-shaft $c^2$ near to its front end and in such manner as to receive in the eccentric slot or groove $h^2$, made through it, the friction-roller $i^2$, Fig. 12, said roller being affixed to the front arm, $w'$, and upon the projecting pin $k^2$ thereof in such position and manner that when motion is given to the rocker-shaft $c^2$ by the crank and the intermediate parts it will cause the aforesaid alternator to have a reciprocating motion and carry the roller $i^2$ through all parts of the said slot or eccentric groove $h^2$ through or in said alternator. This operation will give a regular and progressive motion to the roller $i^2$, the arms $w'$ $w'$, and the frisket-carriage, to which they are attached, and will hold said arms and carriage still at and during the proper time, according as the direction of said slot in its different parts varies more or less from or coincides with the arc of a circle whose center is the center of the rocker-shaft $c^2$.

The alternator $g^2$ is made to perform its office as follows: When the various operating parts of the machine occupy the positions in which they are represented in Fig. 1, the friction-roller $i^2$ will be in the upper extremity of the slot of the alternator, and the frisket-carriage and the two inking-rollers $s'$ $s'$ will be drawn to their extreme limit of motion toward the right-hand end of the machine. Now, supposing the machine in operation, the operating parts being situated as just mentioned, the moment the axis of the crank $h$ passes its line of centers it will cause by its operation on the connecting-rod $e^2$ and lever $d^2$ and rocking shaft $c^2$ the alternator to begin its motion toward the left-hand end of the machine, which motion being continued causes the friction-roller $i^2$, while moving along with the alternator and carrying with it the arms $w'$ $w'$ and the frisket-carrriage and inking-rollers $s'$ $s'$, to descend gradually in the slot of the alternator until its center reaches the dotted line $l^2$, where said slot begins to be an arc of a circle whose center is in the axis of the rocker-shaft $c^2$. The motion thus produced to this extent will have given the frisket-carriage its entire motion toward the left, and have brought the inking-rollers $s'$ $s'$ to a central position on the distribution-cylinder $w$, where they remain and receive a distribution of ink until the crank $h$ shall have caused the alternator to perform the remaining part of its motion toward the left, and a reversed motion such as to carry the center of the roller $i^2$ again to the dotted line $l^2$. This having taken place, the said roller will begin to rise toward the upper part of the slot of the alternator, and to move toward the right-hand end of the machine and carry with it the said arms, frisket-carriage, and inking-rollers until these parts have all received their requisite motion in that direction. On completion of the same the crank $h$ will again pass its said line of centers and produce the motions in the opposite direction, as before described.

During the progress of the process of distribution the sheets to be printed must be successively laid upon the tympan and pointed so as to make register.

Figure 13:
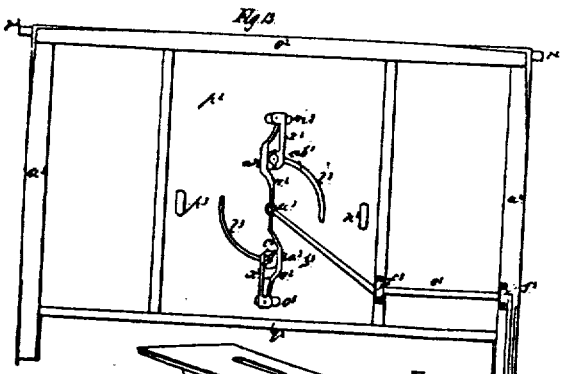

The following is a description of the tympan and the parts intended to govern the register:

$m^3$, Fig. 1, denotes the tympan or feed-board, and Fig. 13 exhibits a view of the under side of it, together with the parts which sustain and operate the register-points $n^3$ $n^3$, Fig. 1. This tympan or feed-board consists of a rectangular frame, $o^3$, covered on its upper side with a sheet-iron plate, $p^3$, which extends from end to end of said frame, and from its upper or right-hand edge down onto the cross-bar $q^3$, thus constituting a regular inclined plane, upon which the sheets of paper to be printed are to be successively laid. Its lower edge rests upon the top edges of the two sides of the press-frame. Its upper part is supported by the gudgeons $r^3$ $r^3$, Fig. 13, which rest in bearings in the upper ends of the standards $s^3$ $s^3$, which are raised respectively above the upper edges of the two sides of the press-frame. (See Figs. 1, 2, and 3.) The tympan is thus suspended in order that it may be turned up nearly to a vertical position, so as to make room for the platen to be moved off from over the bed.

$t^3$ $t^3$, Fig. 1, denote small holes or cavities made in the inside edge or face of the further side piece, $u^3$, of the frame of the said tympan. These holes are made for the reception of one end of a rod which it is necessary to put across the said tympan-frame for the purpose of sustaining the edges or lower parts of such sheets of paper as may be too wide for said tympan without such or a similar provision. The end of said rod which comes next to the person who points the sheets may be secured to the tympan by passing a pin through one of a number of holes made horizontally through the near end rail of said tympan opposite to the holes $t^3$ $t^3$, said pin being made to enter a hole drilled into the end of said rod. This mode of securing said rod is adopted in order that it may be changed conveniently and quickly from one place to another, or be taken out and dispensed with, according as circumstances may require. The sheets, after they have been pointed, are seized by nippers and dragged from the tympan in a manner hereinafter to be described.

In order to prevent the tearing of the paper sheets at the point-holes, it becomes necessary for the points to be drawn down below the surface of the tympan the moment after the sheets have been fastened upon by said nippers and a moment before they begin to be moved from said tympan. This is performed, and the points again thrust out successively, as follows: The points $n^3$ $n^3$ consist of small spindles, each of which is pointed at one end, but otherwise of uniform size, excepting in the middle, which is enlarged, and has a groove turned or formed in it, the said groove being made to receive the forked end of one of two little levers, $v^3$ $w^3$. $x^3$ $x^3$ denote stocks or frames which sustain the points and their levers. Each of the points rest and move up and down freely through two projections, $z^3$ $y^3$, made upon the outer end of each of the said stocks. Each of the levers $v^3$ $w^3$, which operate said points, is secured to one of the said stocks by means of a fulcrum screw or pin, $a^3$, and each of the said stocks is secured to the iron plate of the tympan by a little screw-bolt, $b^3$, and a confining-nut, $c^3$. The inner ends of the levers $v^3$ $w^3$ are brought together in the center of the tympan, where they are jointed to the end $w^3$ of another bent lever, $e^3$, whose fulcrums or journals are sustained in bearings $f^3$ $f^3$, as seen in Fig. 13, applied to the under side of the tympan-frame. The opposite end or arm of the bent lever passes down between the side piece of the press-frame and the side of the frisket-carriage, as seen in Fig. 1, where it is operated upon as follows: On the side of the frisket-carriage is affixed a little cam, $g^3$, (see Fig. 9,) which is so placed that when said carriage is in operation said cam shall at the proper time pass under the end of the lower arm of the lever $e^3$ and elevate it, which operation, through the action of the levers $v^3$ $w^3$, will cause the points to project above the surface of the tympan, where they will be held the proper period of time by means of the spring $h^3$, Fig. 2, said spring being secured to the inside of one side of the press-frame, and so placed that when said arm is elevated as aforesaid said spring will spring out into or under a suitable notch made for the purpose on the outer side of said arm. By means of another cam, $i^3$, affixed to the side of the frisket-carriage, the spring $h^3$ is pressed back, so as to disengage the said arm, and allow it by its own weight, or by the assistance of a spring, to fall down, and thereby cause the points to be moved downward below or even with the surface of the tympan. The said cam $i^3$ should be arranged on the frisket-carriage in such manner that it may actuate the spring when the said carriage first starts to go toward the left-hand end of the machine, and this it does by coming in contact with the stud $k^3$, projecting from the spring $h^3$. This cam consists of the beveled corner of a sort of latch or click so affixed to the side of the carriage by means of a screw-pin at $l^3$ that in its passage toward the right-hand end of the machine it shall slip or slide over the projection by rising up in the manner of a latch and slipping over, so as not to press said spring from under the notch which holds up the lever $e^3$, and so that the moment the beveled corner or cam has passed the said projection $k^3$ it shall drop down sufficiently to come against said stud and press back said spring, and by that means drop the points, when the carriage begins its motion in the other direction, as aforesaid. It is sometimes necessary that the points be placed so as to range crosswise of the sheet, and sometimes lengthwise or at right angles to the position indicated in the drawings. The holes through the iron plates, therefore, through which the bolts $b^3$ pass to secure the point-stocks to the tympan, are elongated into arcs of a circle, as seen at $l^3$ $l^3$, Fig. 13, whose center is in the screw or pin $a^3$, which joints the levers $v^3$ $w^3$ to the bent lever $e^3$.

9445X

These slots permit the point-stocks to be moved around in any necessary position, to make registers crosswise or lengthwise of the sheet, as circumstances may require, without rendering it necessary to remove the bolts by which the said stocks are secured in their places, and without separating the points or their stocks from the machinery which operates them or from the parts which hold them in their places. The four holes $m^3$ $n^3$ $o^3$ $p^3$, Fig. 13, which are made through the iron plate of the tympan and for the points $n^2$ $n^2$ to project through, must also be made curved, and long enough to allow of the necessary variation of the points from central lines across the tympan. The sheets to be printed are successively laid by the attendant in a central position on the tympan above described. The points, having been first properly adjusted and secured in their places, so as to produce register, are thrust through each sheet by pressing the sheet down upon them.

The nippers which take the sheets from the tympan are constructed as follows: There should be several sets for each press, (two or more pairs in a set, as the length of the sheet may require,) each set differing in length from the others, according as the sheets to be printed may vary in width one from another, the widest sheets requiring the shortest nippers, and the narrowest sheets requiring the longest ones.

$q^3$ $r^3$, Fig. 1, denote the nippers as they appear the moment before being closed for the purpose of seizing the edge of a sheet.

Figure 9:
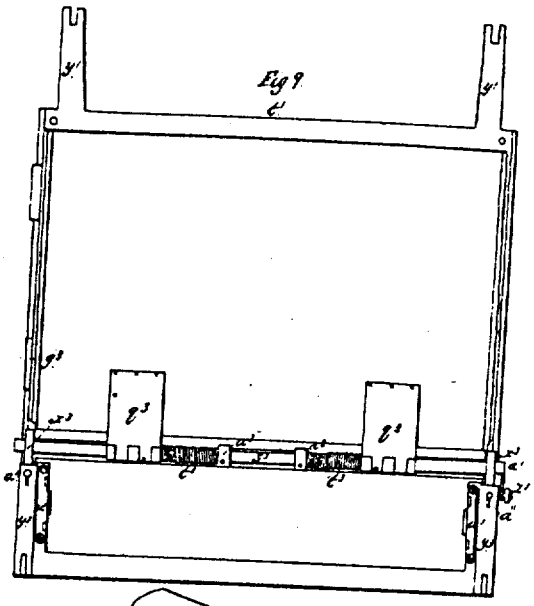

$s^3$, Figs. 1 and 9, is a rod, which extends across from side to side of the frisket-carriage, and is so affixed to said carriage as to turn in bearings in its side rails.

The nippers are composed of thin plates $q^3$ $r^3$, of steel or other suitable material, jointed together, so as to open and close on said rod $s^3$ in a manner similar to that in which the leaves for a common door-hinge are jointed together, and turn on the pin which secures them together. The upper half or part, $q^3$, of each pair of nippers is secured by means of set-screws or otherwise to the rod $s^3$, while the lower half or part thereof is allowed to turn freely on said rod. The said lower parts, $r^3$, are drawn up toward the upper ones by means of wire springs $t^3$ $t^3$, which are wound around the rod $s^3$, one end of each of said springs being attached by means of the collars and set-screws, as seen at $u^2$ $u^2$, to said rod. The other end of each of said springs is attached to one of the said lower halves or parts of the nippers.

As a means by which the lower halves of the nippers may be kept in a horizontal position, while their upper halves are elevated, and by which the time of closing said nippers together may be controlled, there is a projection, $u^3$, which proceeds from the lower part of the hinge part of each lower half or part, $r^3$. These projections, while the lower blades of the nippers occupy horizontal positions, remain under the projecting hook of a catch-bar, $v^3$, (a transverse section of which is seen in Fig. 1,) which extends entirely across the frisket-carriage, and is sustained therein by pivots, which project from its ends at the angular part $w^3$, and rest and move in bearings in the side rails of said carriage in such manner as to allow the projecting hook to be pressed back by the projections $u^3$, which act on its inclined top when the nippers are brought down into a horizontal position. As soon as the same takes place the said catch-bar will be immediately moved forward by the action of gravity to its place over the projections $u^3$ $u^3$, as shown in Fig. 1. The lower halves or parts of the nippers will be thus held in a horizontal position until the proper moment for them to be raised upward. At such time the hook of said catch-bar is drawn away from the projections $u^3$ $u^3$, and this permits the springs $t^3$ $t^3$ to force up the lower blades, $r^3$ $r^3$, and close them upon or against the upper ones. The upper blades of the nippers should be made so much longer than the lower ones as to allow of their lapping about an eighth of an inch onto the lower edge or bar of the tympan, the lower blade being short enough to allow it to be brought up against the upper blade without touching said tympan. It is necessary that the horizontal motion of the nippers toward the tympan or feed-board should be stopped a little before the frisket-carriage has arrived at its extreme limit of motion toward the right-hand end of the machine or away from the platen in order that the said nippers may seize the sheets when they (the nippers) have no other motion than that of the closing of the two halves or blades toward each other and the sheet between them; otherwise the sheets might be so jarred or moved from their places after having been pointed as to spoil the register. In order to effect this object, the journals of the rod $s^3$ are made to enter grooves made horizontally in the edges of the perpendicular parts of the side rails of the frisket-carriage. To keep the rod $s^3$ pressed firmly against the inner end of said grooves, and at the same permit it to slide longitudinally in the grooves, small pistons or slides $x^3$ $x^3$, Figs. 1 and 9, are respectively inserted in the ends of the hollow cylinders $y^3$ $y^3$, in which are helical springs to press said pistons out in such manner as to cause them to enter said grooves and to press firmly against the journals of said rod $s^3$.

For the convenience of taking the rod $s^3$ out of its place in order to change the nippers or for any other purpose, one end of each of the cylinders $y^3$ $y^3$ is jointed to a projection from the corners of the frisket-carriage and in such manner as to allow (after the pistons $x^3$ $x^3$ have been drawn out of the grooves or bearings of the rod $s^3$, the same being effected by the pressman applying his hands to small studs $a''$ $a''$) the other ends of said cylinders to be raised up sufficiently to permit said rod to be removed. The nippers are actuated in part by means of a small friction-roller, $z^4$, Fig. 9, affixed by means of a screw pin or pivot to an arm, $a^4$, which projects from one end of the rod $s^3$ and at right angles to said rod. The said roller operates in an irregular or crooked groove, $b^4$, Fig. 3, made in a plate fixed on the inner surface of one of the side pieces of the press-frame.

The nippers perform their office in the following manner: Let it be supposed that the machine is in motion and that a sheet of paper has been properly pointed with its left-hand edge projecting far enough over the lower edge or bar of the tympan for the nippers to take firm hold of it, also that the nippers are just advancing from under the platen. At this moment the friction-roller $z^4$ will enter the before-named groove $b^4$, which is so crooked as to force the said roller downward, and thereby while the nippers are advancing toward the tympan cause the rod or shaft $s^3$ to turn in its bearings and elevate the upper blades of the said nippers high enough above the tympan to pass over the edge of the sheet of paper on it. Said nippers continue to move on until they have approached quite near to the tympan, when, by an opposite bend in said groove, said upper blades are made to descend suddenly upon the sheet of paper, their ends being made to lap, as before named, about an eighth of an inch over the lower edge or bar of the tympan in order to secure the sheet in its place. At this moment the projecting ends of the rod $s^3$ should be made to meet stationary projections $c^4$ $d^4$ on the sides of the press-frame, and so disposed as to arrest the further progress of said rod toward the tympan or feed-board. The frisket-carriage, however, continues to move on a short distance or until the catch of the bar $v^3$ is advanced sufficiently to disengage the projections $w^3$ $w^3$ of the lower blades of the nippers, which having taken place the springs $t^3$ $t^3$ will instantly throw up said lower blades and secure the sheet firmly against the upper ones. As soon as the nippers have been thus made to seize the sheet, the frisket-carriage will be made to begin its motion toward the bed and platen, which movement at first will cause the points to be drawn from the sheet, as above described, the springs in the hollow cylinders $y^3$ $y^3$, causing the rod $s^3$ at the same time to recede in the grooves in which its pistons $x^3$ $x^3$ play and resume its proper bearings. Said rod $s^3$ will then leave the projections which stopped it, as described before, and the frisket-carriage continuing to move toward the bed and platen, the sheet of paper will be drawn by the nippers from the tympan or feed-board, the said nippers by the action of the aforesaid groove on the friction-roller $z^4$ being made to travel back through the same track in which they had moved in the opposite direction and made to resume a horizontal position just as they are carried between the bed and platen, the sheet as it slips from the tympan being caused to fall and be received upon the frisket $e^4$, which is of the ordinary character, and rests upon the top of the frisket-carriage $t'$, where it is kept in its place by steady-pins or other suitable contrivances. Thus in the above-specified manner the sheets are successively drawn from the tympan, deposited on the frisket, and introduced in a horizontal position between the platen and the form of types.

The groove $b^4$ on the side of the frame and for the operation of the nippers, as above described, instead of being made stationary, may be made movable, and may be operated by means of levers and rotating cams or their equivalents. By such means the nippers may be made to fasten upon the sheet while their horizontal movement is stopped or otherwise, as may be found advisable.

One peculiarity in the operation of the above-described nippers consists in their being made to secure the sheets from movement on the tympan, this being effected by means of the upper blades of the nippers, as aforesaid, and before said nippers are entirely closed. Another peculiarity in the same consists in said nippers being made to close upon the sheets while their horizontal motion is arrested, both of which characteristics are important in order to secure good register.

The following is another mode of constructing the nippers and the parts which operate them, by which the same advantages are attained:

Fig. 10 is a top view of one half of the frisket-carriage, so modified as to be suitable to receive a frame, which I call a "nipper-frame," now to be described, and which is calculated to carry and operate the nippers. Fig. 11 is a side elevation of the same half of the frisket-carriage, together with one half of the nipper-frame, having a pair of nippers secured it, said nipper-frame being so elevated as to bring the nippers in the position they would occupy at the moment of taking hold of the paper on the tympan. Fig. 14 is a top view of the nipper-frame complete, and separated from the frisket-carriage. It is composed of several parts, as follows: Fig. 15 is an outer frame, which serves as a stock to attach all the other parts to. Fig. 19 is a view of the end of said frame with the friction-roller $f^4$, by means of which said frame is elevated and depressed when in operation. Fig. 20 is a view of the other end of said frame. The said frame is suspended in the frisket-carriage by means of the pivots $g^4$ $g^4$, Figs. 14 and 15, which are made to enter holes made through the projections, (one of which is seen at $h^4$, Figs. 10 and 11,) which are raised for the purpose from the two corners of the frisket-carriage. These pivots may be put into holes made for that purpose in the ends of the main stock, Fig. 15, of said frame, and said pivots may be caused to project therefrom by helical springs placed in the bottoms of said holes. When so applied to the said stock, the said pivots may be pressed in even with

9445X

RX 116 the ends of said stock, and so as to enable a person to disengage it from the frisket-carriage and remove it therefrom. On the inner side of each of the end pieces of the main stock, Fig. 15, of said frame are grooves made and covered with thin pieces of steel $i^4$ $i^4$, calculated to receive the end pieces, $k^4$ $k^4$, of an inner frame, $l^4$, Fig. 16. Fig. 18 is a view of one end of this inner frame, and Fig. 17 is a view of the other end. When said inner frame, $l^4$, is in its place, the end pieces, $k^4$ $k^4$ lie in the aforesaid grooves in the inner sides of the end pieces of the said stock, where they can be moved out about half an inch, but are prevented from slipping any farther out than may be proper by means of the two little screws $m^4$ $m^4$, Fig. 14, put into holes, which may be seen at $n^4$ $n^4$, Figs. 17 and 18, the heads of said screws being made to come against the ends of the plates $i^4$ $i^4$ when said inner frame is pressed out to the place it generally occupies, by means of the flat steel spring $o^4$, disposed as seen in Fig. 14.

Each nipper is composed of an upper half, $p^4$, (which is made of a thin plate of steel bent nearly into a right angle, as seen in Fig. 11,) and a lower half, which has a hinge-joint at $r^4$, the part below said joint being riveted or otherwise secured to that part of the upper half which is below the angle thereof. This said lower part of said upper half is that by which the nipper is secured (by means of the screw $s^4$, Fig. 11) to the middle bar of the said inner frame, $l^4$. (See Fig. 11.) $t^4$ $t^4$, &c., Figs. 14 and 16, are screw-holes in said bar, in which the screws which secure the nippers to it are inserted.

$u^4$, Figs. 21 and 11, is a flat bar which is fixed upon the outer face of the bar to which the nippers are attached. Its duty, which is to close the nippers, is performed as follows: Screws, such as are denoted by Fig. 22, and having friction-rollers, as seen in Fig. 23, are put through peculiar diagonal-shaped slots $v^4$ $v^4$ $v^4$, &c., of said bar, and are screwed into corresponding holes in the middle bar of the frame $l^4$ in such manner as to allow the bar $u^4$ to be slipped back and forth endwise, in order to cause said friction-rollers and screws to work freely through the whole lengths of the the slots. Now the end $w^4$ of the bar $u^4$ is fitted to the inside of the forward end of the right-hand end piece of the stock in the manner of a miter—that is to say, both are made angular or beveled, as seen in Figs. 14 and 15—so that when the inner frame is pressed in toward the main body of the stock the beveled end of the said end piece of said stock operates against the end of the sliding bar in the manner of a cam or wedge, and causes it to slip along on the middle bar of the frame $l^4$, where, by the friction-rollers, Fig. 23, and screws, Fig. 22, are caused to operate through the said diagonal slots $v^4$ $v^4$, &c. The upper sides of said slots move over and upon said friction-rollers and screws in the manner of inclined planes, and so as to cause said bar $u^4$ to rise up and bear or crowd its upper edge against the lower blades of the nippers, and so as to force or turn said lower blades upward against the upper ones, and cause both of said blades to take firm hold of the paper which is laid upon and to be drawn off the tympan or feed-board.

The manner in which these nippers perform their office is as follows: Let it be supposed that a sheet has been properly pointed on the feed-board, and the nippers are being moved toward it. Just as said nippers emerge from under the platen the friction-roller $f^4$ on the nipper-frame will enter the crooked groove $b^4$ on the side of the frame. This groove or slot, operating on the said friction-roller, will cause the nipper-frame to rise up and elevate the nippers as they advance until the forward ends of their upper blades shall be presented above the edge of the paper on the tympan, when by a sudden bend or turn downward in said groove, or by the operation of a cam or other mechanical equivalent, as before mentioned, the ends of said upper part or parts of the nippers will be brought suddenly down upon the lower edge of the tympan and the sheet which may have been laid on it. At the instant this occurs projections $v^3$, Figs. 11, 16, 17, and 18, from the corners of the inner frame meet projections $c^4$ $d^4$, Figs. 2 and 3, from the sides of the frame, which arrest the further progress of that part of the nipper-frame and the nippers; but the frisket-carriage and consequently the main stock of the nipper-frame continuing to move on for a short space further, the said inner frame, $l^4$, Fig. 16, is pressed in toward the main part of the stock sufficiently to cause the beveled end $w^3$ of the end piece, $x^3$, of said stock to operate on the sliding bar $u^4$ and cause it to close the nippers upon the sheet, as above described. The movement of the frisket-carriage in the opposite direction carries the sheet in between the bed and platen, the same as in the case of the nippers first described. The bar $u^4$ is thrown back so as to relieve the pressure of nippers upon the paper, as follows:

$y^4$, Fig. 2, denotes a wedge or cam affixed by one end by means of a screw, pin, or pivot, $z^4$, to the side of the frame of the machine in the manner of a latch or click, its place on the side of the frame being such that very soon after the nipper-frame shall begin its motion toward the right-hand end of the machine the end $y^3$ of the bar $u^4$ will be brought against the wedging part $a^3$, which will cause said bar to slide back endwise, its diagonal slots at the same time allowing it to drop down, and thus to relieve the lower blades of the nippers, so that said nippers shall open to receive the sheet as the nipper-frame shall be elevated, as before described. When the nipper-frame, with the nippers closed, shall be in motion toward the left-hand end of the machine the end $y^3$ of said bar $u^4$ will be brought in contact with the under side of the wedge $y^4$, and will elevate it so as to pass under it.

As soon as the bar passes beyond the wedge-click, the latter will drop back to its place of rest, where it will be ready at the proper moment again to operate on the bar $u^4$, as aforesaid. The bed on which the form of types is placed is represented at $b^5$, Fig. 1, the said form being also exhibited at $c^5$.

The bed is constructed in the usual manner, and must be strong enough to sustain the impression. While it rises or falls it is kept steady in its place by means of projections from its ends, which slide in grooves $d^5$, Figs. 2 and 3, formed on the side pieces of the frame, and also by a guide-piece, $e^5$, Fig. 1, firmly secured to said bed, and made to project into other vertical grooves formed on the sides of the frame at $f^5$, Figs. 2 and 3. The bracing-rods $g^5$, Fig. 1, also serve to preserve the horizontal position of the bed.

The platen is represented at $h^5$, Fig. 1. Fig. 24 is a projection of the same, showing its top side, together with certain parts attached to it, to be hereinafter described.

$i^5$ denotes the bottom bar which sustains the impression. It extends across the machine, and is connected by its ends to the platen by strong iron bolts, which pass up by the sides of the press-frame from the said ends, and are received in the openings $k^5$ $k^5$, Fig. 24, prepared for the purpose in the side and near the ends of the strong rib-piece $l^5$, which passes over the top of the platen and forms a part of it.

$m^5$ $n^5$, Fig. 1, are progressive levers, called "toggle-joints," by which the bed is successively raised up, so as to bring the types in contact with the sheets against the face of the platen with suitable force to produce the impressions. The lower end of the lower one, $n^5$, rests on a ledge, $o^5$, projecting from the side of the bottom bar at its lower edge. The upper end of the upper one, $m^5$, is made to operate against the under side of the bed, as seen at $p^5$, Fig. 1.

The toggle joints are operated by means of the alternator $q^5$, which is in principle of construction and operation very similar to that described for operating the frisket-carriage.

$r^5$ is a friction-roller, against which the alternator acts to throw up and straighten the toggle-levers. Said roller is placed on the center joint-pin, $s^5$, and in a slot, $t^5$, about four inches wide (the length of the roller) in the middle of the toggles, said slot being made to extend from $u^5$ in the upper lever to $v^5$ in the lower one, and forms a suitable opening for the alternator $q^5$ to play through.

$w^5$ denotes a pitman, connected at one end by means of the pin $x^5$ with the said alternator $q^5$, and at the other end (by means of a strap, key, and boxes) to the crank-pin $f^4$, Fig. 7, which projects from the side of the rotating toothed wheel. The left-hand end of the pitman is forked, so as to receive the upper part of the alternator $q^5$ between its two flat prongs. The pin $x^5$ is put through the said prongs and through the crooked slot $y^5$ in said alternator, which slot has an abrupt depression at one end of it, which forms a suitable bearing for the said pin $x^5$.

The operation of the alternator in straightening the toggle-joints, elevating the bed, producing the impressions, and lowering the bed down again is as follows: Let it be supposed that the machine is in motion, and that the crank $f^4$, Fig. 7, by means of the pitman, has thrown the alternator forward toward the toggles until the part indicated by the dotted line $z^5$, Fig. 1, has arrived as far as the center of the friction-roller $r^5$. The side of the mouth of said alternator toward the crank will now form a curved inclined plane on one side of the main part of the said alternator, which, continuing to advance, will now act against the roller $r^5$, so as to press it forward, somewhat in the manner of a lever of the second class, ($a^6$ being the fulcrum,) and will cause said roller to roll up the said curved inclined plane until the toggle-joints are brought nearly into line with each other, and the impression is produced. The instant the impression will have been thus produced the crank $f^4$ will have passed its line of centers and will begin to draw back the alternator, which, by a reverse action against the friction-roller $r^5$, will bring the toggle-joints and the bed in proper time to their places of rest, as seen in Fig. 1. That part of this alternator from $b^6$ to $c^6$ is formed as an arc of a circle whose center is in the fulcrum $a^6$ of the alternator. Its office is to keep the toggles and bed down steady in their places during the time when the types are being inked by the inking-rollers.

$d^6$ is a slide, which is embedded in a groove, $e^6$, made in the side of the alternator $q^5$ in such manner as to allow of it being slipped up against the pin $x^5$, so as to raise said pin out of the depression of the slot in the upper part of the alternator, in order that when the pitman is thrown forward said pin shall slip through the remaining or curved part of the slot, and thereby in order to prevent an impression being produced allow the alternator to stop short of the place it is carried to when impressions are produced. This slide is operated by means of two arms or levers, $f^6$ $g^6$, affixed to the two ends of a rocker-shaft, $h^6$, (see dotted lines in Fig. 6,) one end of which has a bearing in the box $i^6$, Fig. 6, and the other end a bearing in the hole $k^6$, Fig. 3, made in the side of the frame. The arm $f^6$ at one end of said shaft has a friction-roller, $l^6$, affixed near to its outer end. Said shaft is so placed as to bring said friction-roller under the curved part $m^6$ of said slide. The arm $g^6$ on the other end of said shaft should be made of the necessary length and shape to bring its outer end into close proximity with the foot of the person who may be employed to lay the sheets on the tympan. When it may be necessary to prevent an impression, such person may with the foot upon the outer end of said arm depress it so as raise the said friction-roller against the said curved part of said slide, and thereby elevate the said slide and the pitman, so as to cause said pin $x^5$ to pass into the upper part of the slot, as aforesaid.

$n^6$, Fig. 1, denotes one of two or more spiral springs, which are made to counterbalance the weight of the bed and the forms of types. They rest at the bottom upon a sort of frame, $o^6$, the rock shaft or bar $p^6$, which constitutes one side of said frame, forming a rocker-shaft with gudgeons at its ends, which rest in bearings $q^6$ $q^6$, Figs. 2 and 3, made on the sides of the frame of the machine. This frame $o^6$ is connected, by the arms $r^6$, projecting from each end of the rock-shaft, with two vertical connecting-rods, one of which is seen at $s^6$, the two upper ends of which are jointed to two corners of the bed. The upper ends of the said springs are made bear against a cross-bar, $t^6$, jointed to the ends of two levers, one of which is seen at $u^6$, Fig. 1, extending, respectively, from fulcra fixed to the bed. The pin of the upper joint of the upper toggle passes through both of these levers. By means of this device the toggles are held up against their bearings on the under side of the bed in such manner as to allow the wedge $v^6$, through the action of a screw, $x^6$, to be drawn out or forced in between the bed and the piece $w^6$, which constitutes a bearing for the said pin, the same being for the purpose of lessening or increasing the impression by lessening or increasing the distance between the upper joint of the toggles and the face of the bed upon which the form of types rests.

$y^6$ $y^6$ $y^6$ $y^6$, Figs. 1 and 24, are wheels, which sustain the platen upon the horizontal railways formed of the upper edges of the two side pieces, Figs. 2 and 3, of the frame. These wheels, which sustain the platen, are fixed to the ends of shafts $z^6$ $z^6$, which have journals that run in bearings at $a^7$ $a^7$ $a^7$ $a^7$, Fig. 24. The office of said shafts and wheels is to serve as a carriage, by which the platen may be easily moved from over the form of types and back when such form is to be changed or another put on; or for any other purpose. The parchment tympan is secured to the face of the platen by means of a frame, $b^7$, Figs. 1 and 24, which is made to surround the edge of the platen, and is secured in its place by slide-bolts or other proper contrivances. The blanketing is put within this tympan and between the parchment and platen.

Figure 25:
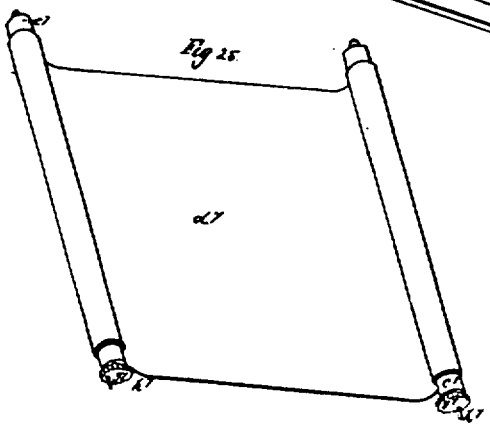

The tympan-sheet $d^7$, Fig. 25, consists of a long sheet of paper or other suitable material, which is to be rolled up on a roller, $c^7$, Figs. 24 and 25, which roller is suspended by its journals in bearings attached to one side of the platen. From this roller the end of the sheet is taken and passed under the platen, so as to cover that part which the types are to be pressed against when an impression is produced, and secured to another similar roller, $e^7$, situated at the other edge of the platen, said roller $e^7$ being suspended by its journals in bearings, which rest on springs $a^{10}$ and are jointed to the platen at $b^{10}$. The said springs are for the purpose of causing the rollers to take up any slack which may occur in consequence of a stretching of the sheet, and also to allow of the rollers conforming to any difference of length which there may be in the two edges of the said sheet. These rollers, together with the parts connected with them, constitute a convenient device by which the tympan-sheet is well secured over the face of the platen and easily and quickly exchanged from place to place whenever that part of it against which the impression may be produced may become soiled. When a place on said tympan has become soiled, the rollers $c^7$ $e^7$ are to be turned in such manner as to unwind the tympan-sheet from one roller, and to wind up the soiled part of said sheet on the other roller. Thus a clean part of said tympan-sheet may be successively drawn over the face of the platen, according as circumstances may require. When said sheet has been drawn smooth by said rollers, they are secured from turning back (so as to unwind or loosen said tympan-sheet) by means of pawls $f^7$ $f^7$, (or other suitable means,) said pawls being affixed to the platen and respectively dropped into the teeth of the ratchet-wheels $g^7$ $g^7$, fixed on the ends of the said rollers.

Fig. 25 is a separate projection of the tympan-sheet and the rollers $c^7$ $e^7$ for operating it. $h^7$ $h^7$ are handles, by which said rollers may be turned around. The ends of the sheet are secured to said rollers by putting each of them into a groove, $c^7$ and $e^7$, Fig. 1, (made along in the side of each of the said rollers,) and afterward pressing a rod into each of the said grooves, so as to wedge and confine the said sheet to the rollers.

In Fig. 1, $i^7$ denotes a movable table, which stands on and above the platen, and may be unshipped at will by the operator, and is intended to receive the heap of paper from which the sheets to be printed are to be successively removed. The sheets, after they have been printed, are successively separated from the types and removed from the press and laid upon a table, as follows:

In Fig. 1, $e^4$ denotes the frisket. It consists of a square frame made of thin iron, and covered with strong paper or other suitable material in such manner as to leave suitable spaces for the pages of types to project through in order to produce an impression on any sheet which may lie upon said frisket. This frisket rests on the top of the frisket-carriage, and is kept in its place by means of steady-pins, which ought to be so put into said frisket and carriage as to allow said frisket to be moved up and down a little in its place, and also to allow of its being easily removed from the carriage. Successively after each of the impressions have been produced on the sheets of paper the frisket holds the said sheets up while the types are allowed to sink down, and thus said frisket (together with the nippers, which at the time hold onto the sheet)

serves to overcome the adhesion of the ink, and to separate the sheets from the type, this being the beginning of the process of removing the sheets from the press. After each of the sheets of paper has thus been separated from the type, the frisket-carriage begins its motion toward the right-hand end of the machine, and each sheet is carried out in a horizontal position on said frisket from between the type and platen until it has advanced to a certain position. When this takes place, the forward edge thereof will be elevated by means of a bellows, or some equivalent device, in such manner as to allow of its being taken hold of by a system of rollers and bands. Rollers or pulleys alone may be made to answer the purpose, whose office is to withdraw successively the printed sheets from the frisket and present them to the action of an instrument which I call a "fly," which being accomplished the said instrument removes the said sheets from said system of rollers and bands and throws them on the pile or table, or other convenience provided for the purpose, as follows:

Fig. 7 is a detail view of most parts of the taking-off apparatus as seen in their relative places, the spectator being supposed to be standing at and looking toward the right-hand end of the machine.

$k^1$, Figs. 1 and 7, denotes a bellows, which is sustained in its place by proper means. Said bellows has two long slits, $l^1$ $l^1$, or any proper number of holes made through its top board, the same being to allow of the escape of air upward when said bellows is closed, and for the admission of air when it is opened. This bellows is operated as follows:

$m^1$, Figs. 1 and 7, denotes a transverse rocker-shaft sustained by its gudgeons in proper bearings on the sides of the frame. This rocker-shaft is provided with two arms, $n^1$ $n^1$, which extend underneath the bellows for the purpose of operating it. Said shaft is also provided with another arm, $o^1$, which extends in an opposite direction to that of the arms $n^1$ $n^1$, and has a friction-roller, $p^1$, affixed on a screw pin or pivot near to its end. Said roller is for the cam $q^1$, which is affixed to the shaft $i$, to operate against.

Figure 26:
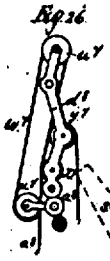
Figure 1:
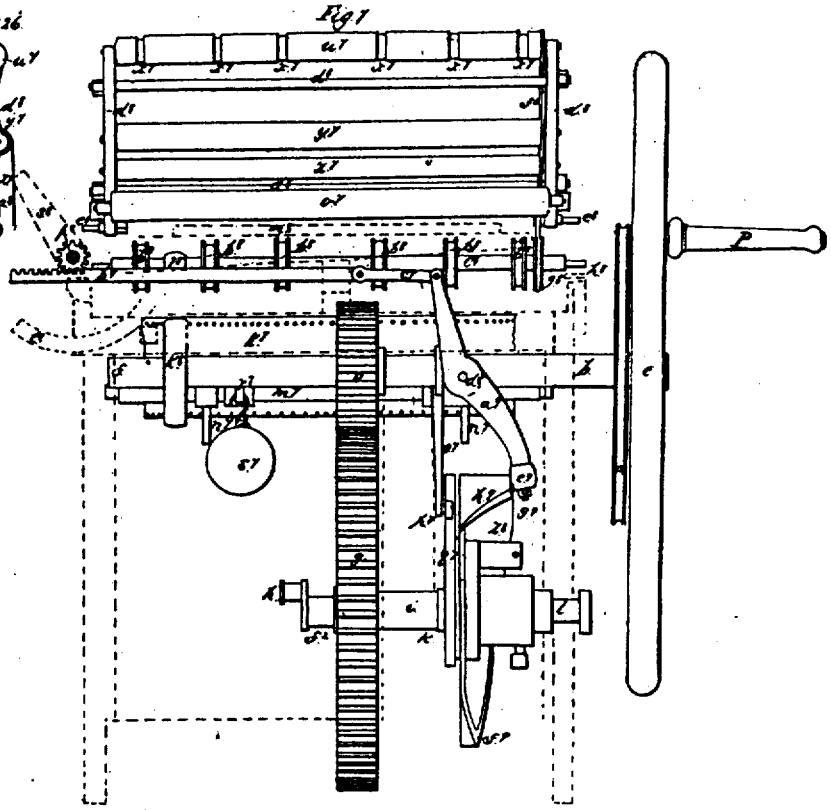

$r^1$ is another arm, which also extends from the rocker-shaft $m^1$ and has a weight, $s^1$, suspended from its outer end. The proper shape of the cam $q^1$ is indicated in Fig. 1. The cam $q^1$ being in the position represented in the drawings, the friction-roller $p^1$ should bear upon said cam at $t^1$, in which case the bellows would be closed; but in order to show the bellows open in the drawings I have drawn the said friction-roller and the arm to which it is attached, as well as the other arms of the rocker-shaft $m^1$, in the positions they are carried into when the bellows is opened. Now, let it be understood that the machine is in operation, and the friction-roller $p^1$ bearing on the cam $q^1$, as aforesaid. In such case the cam will operate on said friction-roller, and will communicate motion to it and the arm $o^1$, and by means of said arm $o^1$ and the rocker-shaft $m^1$ motion will also be communicated to the other arms, $n^1$ $n^1$ and $r^1$, so as to bring said arms severally into the positions in which they are represented in the drawings. The bottom board, $t^1$, of the bellows will follow by its own gravity and descend with the arms $n^1$ $n^1$ until said bellows is fully open. About this time the most prominent part of the cam $q^1$ will pass in contact with the said friction-roller $p^1$ and leave said roller free to descend. This being effected, the weight $s^1$ will draw down the arm $r^1$, and by means of the said rocker-shaft $m^1$ and the arms $n^1$ $n^1$ will will force up the bottom board, $t^1$, and close the bellows, and thereby expel the air swiftly through the slits or holes through the top thereof. The air in passing up through holes made through the frisket will impinge against the sheet and elevate it sufficiently to allow of its being taken hold of by the delivering-rollers, as above named. By turning the cam $q^1$ around on its shaft $i$, either one way or the other, and to such extent as the case may require, and afterward securing the same by means of a set-screw to the shaft, the period of blowing the bellows may be regulated so as to cause the current or currents of air from it to strike against the sheet of paper at the proper time and place. The said delivering-rollers may be constructed and be made to operate as follows:

$u^1$ $v^1$, Figs. 1, 7, and 26, (the latter figure being an end view of the system of rollers now to be described,) denote two rollers extending from side to side of the machine. The said rollers have a series of endless bands or tapes (one of which is seen at $w^1$, Figs. 1 and 2) running over them in the grooves $x^1$ $x^1$ $x^1$, &c., Fig. 7.

$y^1$ $z^1$, Figs. 1 and 4, denote two other similar rollers, which have another and corresponding series of endless bands, $a^8$, running around them, and certain grooved pulleys, $b^8$ $b^8$, &c., Figs. 1 and 7, which pulleys are placed on the transverse shaft $c^8$. The number of bands may be more or less, according to the size of the sheets the machine may be intended to print. The rollers $u^1$ $v^1$ and their bands may be regarded as one set, and the rollers $y^1$ $z^1$, with their bands, may be regarded as another set of said rollers and bands. The said sets of rollers are arranged in and sustained by a frame, $d^8$, as seen in Figs. 1, 7, and 26. The said frame is supported by two of its corners on the top rails of the press-frame. Its other two corners are supported by pivots $e^8$ $e^8$ in bearings which admit of the frame and its rollers being raised up into a vertical position, as seen in Figs. 7 and 26, in order to make room to remove the platen from its position directly over the types.

$f^8$, Fig. 7, denotes an endless band which runs around a pulley, $g^8$, on the shaft $c^8$, and the roller $u^1$, the same being to assist in driving the rollers $u^1$ $v^1$ $y^1$ $z^1$. The pivots of the shaft $c^4$ run in bearings $h^4$ $h^4$, affixed to the top edges of the side pieces of the frame of the machine, as seen in Figs. 2 and 3. These bearings should be made adjustable. The said delivering pulleys, rollers, and bands are driven or put in motion by means of an endless band, $i^4$, which runs over the pulley $k^4$ on the fly-wheel shaft, and the pulley $l^4$ on the shaft $c^4$. By means of a proper proportion between the diameters of the pulleys $k^4$ $l^4$ any desirable speed may be given to the delivering rollers and bands, so as to quickly present the sheets to the action of the fly, to be hereinafter described, without interfering with the action of any other part of the machine.

Figure 27:
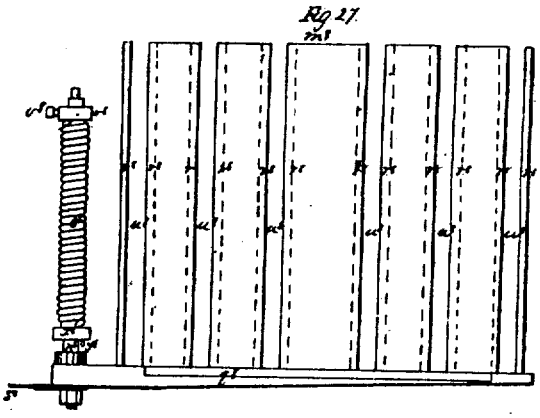

The operation of the delivering rollers and pulleys and bands is as follows: Supposing the machine to be in action, and the frisket to be carrying a sheet out from between the bed and platen, and that such sheet has arrived at the proper place for it to be elevated by the bellows, as before described, the moment said sheet is so elevated the forward movement of the frisket will cause the sheet to enter between the aforesaid two sets of rollers and bands, which rollers and bands, as well as the pulleys on the shaft $c^4$, being in motion, will quickly draw said sheet from the frisket and present it to the action of the fly $m^4$, Figs. 1 and 27, whose construction and operation is as follows: Fig. 27 denotes a top view of said fly $m^4$, including the rocker-shaft $n^4$, to which said fly is attached, the spring $o^4$ on said rocker-shaft, by which the fly is successively thrown over to lay the sheets on the pile, and the toothed wheel or pinion $p^4$, by means of which the fly is brought back to the proper position for receiving the sheets from the delivering-rollers. Said fly is composed of the arm or stock $q^4$, Figs. 1 and 27, and a series of fingers or prongs, $r^4$ $r^4$, &c., which project from said stock, as seen in Figs. 1 and 27. Every succeeding pair of said fingers except the two outer should be covered with light cloth or other suitable material, as seen in Fig. 27, so as to form a species of web from one finger to the other. The object of this is to enable the air to act against said webs when the fly is put in motion, and modify or retard the velocity which it would otherwise receive. A friction-spring, $s^4$, Fig. 27, is made to cooperate in the same object. This it does when the fly is thrown over by sliding along against a sort of curved and stationary cam or inclined plane, $t^4$, attached to the frame of the press, as shown by the dotted lines in Fig. 7. When the fly is in its proper position for receiving the sheets, as shown in Fig. 1 and by the dotted lines in Fig. 7, the several endless bands of the lower set of rollers and pulleys enter the spaces $u^4$ $u^4$, &c., between the fingers. The rocker-shaft $n^4$, to which the fly is attached, is sustained in bearings on the top of the front side of the machine. The winding, or, as it is sometimes called, "spiral" spring $o^4$ on the rocker-shaft $n^4$ is secured to said shaft by means of the collar $w^4$ and the set-screw $v^4$. By means of said collar and set-screw the former may be turned around and secured in any place which may be necessary to adjust or temper the force of the spring to the labor it may have to perform in successively throwing over the fly in order to lay the sheets on the pile. The other end of said spring $o^4$ is secured to the press-frame by inserting it in a hole made in the side of the collar $x^4$, which collar is held fast by means of the pin $y^4$, which projects from it, and is made to enter a hole made in the side of the bearing for the journal of the said rocker-shaft. The fly should be capable of swinging through an arc of one hundred and eighty degrees, more or less, as circumstances may require. The rotating cam $z^4$, Figs. 1 and 7, operates the vertical lever $a^4$, which in its turn moves the horizontal slide and rack $b^4$. Said slide-rack gears into and turns the pinion $p^4$, and consequently the rocker-shaft and fly, to which said pinion is attached, the same being done in such manner as to carry said fly over and into the position it must occupy in order to receive a printed sheet of paper from the delivering rollers and pulleys hereinbefore described.

$c^4$, Fig. 7, denotes a connecting-rod, which by proper joints connects the top end of the lever $a^4$ to the slide-rack $b^4$. The fulcrum of said lever is seen at $d^4$, Fig. 7. Said fulcrum may be affixed to a bracket, which may be bolted to any convenient part of the end piece of the press-frame. It is best that this fulcrum be made capable of proper adjustment. On the lower end of the lever $a^4$ a friction-roller, $e^4$, is placed, it being for the cam $z^4$ to operate against. The part of the cam which gives motion to the lever is seen at $f^4$. The part $g^4$ is used to hold the fly still the proper length of time for the reception of the sheets from the delivering-rollers. The part $h^4$ is quick turn or falling off in said cam calculated to leave the lever $a^4$ free from the action of the said cam at the instant and during the time necessary for the action of the spring $o^4$ when it throws the fly upward and over upon the pile of sheets. The said fly-cam should be made adjustable by being so fitted on the hub of the cam $q^4$ as to be easily turned round upon it, either one way or the other, as the case may require. It may be secured in place by a screw. In case the fly-frame shall be hung upon the front side of the press, as above described, the table for the reception of the pile of printed sheets as they may be delivered from the machine by the said fly must be placed at the right hand and near by the person who may point the sheets on tympan.

Figure 28:
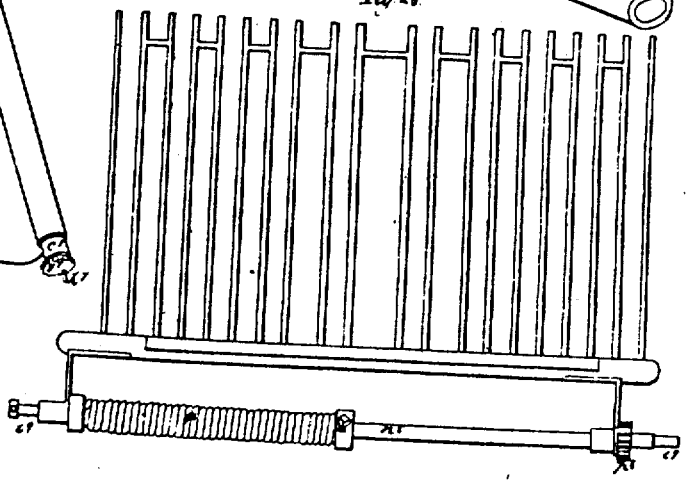
Figure 29:
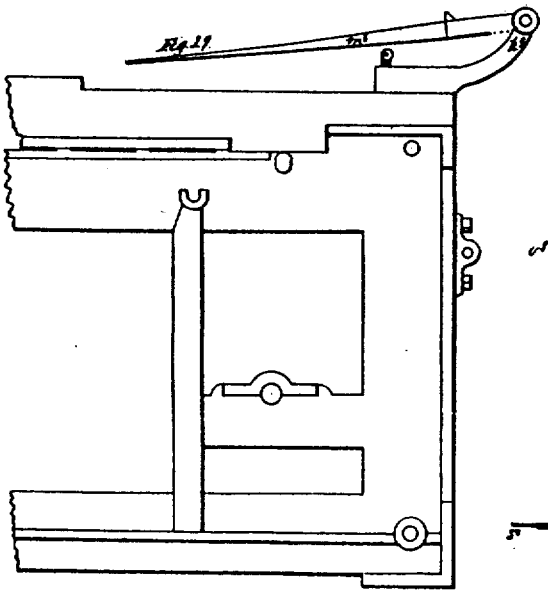

The operation of the fly is as follows: Supposing the machine to be in action, and the fly to be in the required position for the reception of a sheet from the delivering-rollers, and said sheet to be on its way through the said delivering-rollers, and that it is being carried on the bands over the fingers of the fly, the moment its forward edge reaches the upper edge of the stock or arm of said fly, or when said sheet shall be properly presented by said delivering rollers and bands to the action of said fly, the prominent part $g^9$ of the cam will have passed clear of the friction-roller $e^9$. This will leave the lever $a^9$ free to move back or its friction-roller $e^9$ free to move down the part $h^9$ of said cam. The spring $o^9$ will then immediately throw the fly, with the sheet upon it, over upon the table or heap whereon said sheet will be deposited. After the sheet shall have been thus delivered on the heap, the action of the cam on the friction-roller $e^9$ will cause the fly to move back in proper season and to the required position to receive the next sheet from the said delivering-rollers as it may pass through them, as hereinbefore described. In moderate-sized printing-machines it is best that the sheets should be laid off at the front side of the machine, as above described; but in the case of very large machines it may be desirable to deliver the sheets at the right-hand end of the machine. In such case the fly and the machinery to operate it may be modified as follows, to-wit:

Fig. 28 is a top view of the fly, the rocker-shaft $n^8$, to which it is attached, the toothed wheel $p^8$, and the spring $o^8$, which operates said fly. $i^9$ $i^9$ are the gudgeons on which said rocker-shaft turns. $k^9$ $k^9$, Figs. 29 and 30, denote bearings for said gudgeons, affixed to the two sides of the press-frame. $m^8$, Fig. 29, shows the position this fly occupies when receiving a sheet. The dotted lines $m^8$, Fig. 30, denote the position of the said fly when delivering a sheet on the pile or table. Fig. 31 is an elevation of the cam $z^8$, the lever $a^8$, the rack $b^8$, and the toothed wheel $p^8$, by means of which the said fly is operated, all of the parts of this figure severally occupying their proper places relatively to each other. Fig. 32 denotes a projection of the rocker-shaft $n^8$ of Fig. 31, to which the levers or arms $l^9$ $m^9$ of said figure are affixed. $o^9$ is a short arm, to which the arm $l^9$ is affixed, as seen at $p^9$, so as to be adjustable.

The cam $z^8$, Fig. 31, is put on the hub of the cam $q^7$ in lieu of the cam hereinbefore described, and represented in Fig. 7.

$q^9$, Fig. 30, denotes a table to receive the pile of sheets as they may be delivered from the machine. $r^9$ is a rocker-shaft, to which said table is attached by means of one or more arms, $s^9$ $t^9$, jointed to a vertical bar, $u^9$. The lower one of said arms is jointed to the press-frame. By means of said arms and vertical bar $u^9$ the table may be elevated or depressed, as occasion may require.

Having thus described my machine in a detached manner, I will now explain the conjoined operations of the several parts when in combination with each other and for the performance of the usual process of printing. The machine being supposed to be in order for printing, and the fountain properly supplied with ink, the first thing to be done is to turn both the tympan and the roller-frame into nearly vertical positions, in which they may be secured by means of suitable contrivances provided for the purpose. The platen is next to be moved away from over the bed. Next the frisket and the nipper-frame are to be removed, so that the form of types may be conveniently put and secured in its place upon the bed in the usual way. When the frisket has been properly covered and fitted to the form, as before described, it and the nipper-frame may be put in their places, care being taken that a set of nippers of the proper length for the width of sheet to be printed be adapted to the said frame. The platen may next be moved back to its place over the form of types, and the tympan and roller-frame may be turned down to their proper positions. The points must next be attended to and adjusted to their proper places for producing register, by means of the apparatus for the purpose before described. This is best done by experiment, as is usual in other printing-presses. After these things have been properly attended to, let the paper, suitably prepared to be printed, be laid upon the table provided to receive it. The person whose duty it is to point the sheets having placed one foot upon the lever to prevent impressions from being produced, the machine may be started or put in motion. If the inking-rollers are free from ink when the machine is thus put in action, it will be necessary to run the machine awhile without producing any impression, or until the rollers are properly covered with ink. A sheet may next be pointed, and directly afterward the foot must be removed from the lever, in order that the machine may commence its operation of giving the impressions. All parts of the machine being now in operation together, in the manner before described of the several parts separately, and the inking-rollers having rolled over the form of types and covered the faces with ink, the nippers will next advance and seize the sheet of paper on the tympan or feed-board, as before described. The frisket-carriage will next be moved (by its alternator, as before described) toward the left-hand end of the machine. This will carry the cam $i^3$ against the stud $k^3$ and press back the spring $h^3$, and thereby disengage the arm of the lever $e^3$, which will cause the points to be disengaged from the sheet. The nippers will then immediately be made to draw said sheet from the tympan. Said sheet, as it slides from said tympan and as the frisket is carried along under it, drops down upon the frisket, as hereinbefore described. Thus the sheet will be introduced between the platen and the form of types, and when the motion of the frisket-carriage is arrested the sheet will have been brought into a proper position to receive an impression. A little before this happens, the bed (by means of the alternator, as aforesaid) will begin to rise, and immediately after said sheet has become stationary will be forced up by the continued action of said alternator

9445X

Rx 116 and other parts of the mechanism until the form of types is carried in contact with the said sheet and against the platen with sufficient force to produce an impression. The said alternator will then be drawn back by the crank $f^2$, which will cause the bed to descend to the position in which it rests while the types are being inked. The frisket-carriage will next again move toward the right and again carry the inking-rollers over the form and the nippers toward the tympan, and the frisket, having the sheet upon it, out from between the bed and platen and under the feed-board until the right-hand edge of said sheet arrives over the slits or holes in the top board of the bellows. This being done, the cam $q^7$ will allow the bellows to be operated as aforesaid and cause one or more swift currents of air to impinge through the frisket against the sheet of paper and elevate the edge of said sheet, which, continuing to advance by the movement of the frisket, will be quickly seized by the delivering-rollers and carried over the fly, which at the proper moment will be thrown over so as to deliver said sheet on the pile, as above described. In the meantime another sheet will have been pointed and taken by the nippers into the press, said nippers being made to grasp the said sheet about the time that the sheet previously printed enters between the delivering-rollers. The delivering apparatus is thus made to deliver one sheet while another is being carried into the press and printed. The tympan-sheet is most needed when the second side of the sheet of paper is printed; but it should also be used when printing the first side thereof.

All parts of the above-described machine are capable of modification, and equivalents well known to mechanics may be substituted for almost any one or more of them; but as I am persuaded that such modifications or substitutions as may under any circumstances be of any advantage will be readily made by mechanics skilled in the business of press-making, I refrain from further explanation of the same.

Having thus specified my improvements, I shall now proceed to point out the nature and extent of my claims.

I claim—

1. The mechanical combination by which the motion produced by the crank and pitman is so modified and communicated to the toggle-joints as to produce the impressions, and so as to give to said toggle-joints the necessary intervals of rest and reciprocating motion, the same consisting of the alternator $q^5$ and a connecting-rod or pitman, $w^5$, in combination with said crank $f^2$, Fig. 7, and said toggle-joints, or any other mechanical equivalents, acting substantially as specified, the said toggles having a roller, $r^5$, or any mechanical substitute therefor.

2. The mechanical combination employed to operate the frisket-carriage or impart to it with the inking-rollers and nippers their peculiar intervals of rest and reciprocating motions toward and from the form of types, as described, the same consisting, first, of the alternator $g^1$; second, the lever or arm or arms $w'$ $w'$, their rocking shaft $z'$, and roller $i^2$, connected with the alternator and frisket-carriage; third, the rocking shaft $c^2$, arm $d^2$, connecting-rod $e^2$, and the crank $h$, or any mechanical equivalent or equivalents therefor, the whole being made, arranged, and operated together substantially in the manner as hereinbefore specified.

3. In combination with the alternator $q^5$ and pitman $w^5$, the slide $d^6$, operated by the treadle in the manner substantially as described, whereby the pressman at any time while the said alternator is in motion is enabled to prevent it from being thrown or moved against the toggles (or roll thereof) sufficiently to straighten or move the said toggles into line with each other, and thereby produce an impression from the form of types.

4. The combination of mechanism (or an equivalent or equivalents) by which the nippers (seen in Fig. 1) are operated, the same consisting of the rod $s^4$ and its arm $a^4$, the springs $t^4$, the catches $u^4$ and $v^4$, and the grooves $b^4$, and the stops $c^4$ $d^4$, and the rotating cam named in the description.

5. The combination of the said nippers with frisket-carriage, operated as above set forth, the same being for the purposes and constructed substantially as aforesaid.

6. The mechanical combination (or an equivalent or equivalents) constituting the means for making or obtaining register, the same consisting of the movable stocks $x^3$, the points $n^3$, and the levers $v^3$, $w^3$, and $e^3$, and mechanism consisting of the cams $i^3$ and $g^3$ and the spring $h^3$, which operate them, the same being applied and constructed and operating substantially as hereinbefore described.

7. The manner above described of changing the position of the register-points so as to range with each other across the feed-board and the sheet either in one direction or the other, in order to enable the pressman to turn the sheet and print its second side in another direction, all as set forth.

8. The method above described of securing greater certainty of accurate register—that is to say, causing the nippers to rest from their horizontal motion (or from that motion by which they are carried toward the sheets of paper) while they are being closed on the said sheets of paper, and while the carriage or part from which they receive said motion continues its movement, substantially in the manner set forth.

9. The above-described manner of constructing the nippers—that is to say, the making the upper blades somewhat longer than the lower blades thereof, whereby the said upper blades are made to project beyond the said lower blades, in order that they, the said upper blades, may be pressed down upon the edge of the sheet of paper on the tympan or feed-board, so as to hold the paper still thereon while the said lower blades are being brought up to secure said paper in the nippers, the same being of importance for the security of good register.

10. For the additional security of good register, withdrawing the register-points from the paper after it has been seized by the nippers, but previously to its being started from the place in which it has been adjusted or pointed, the same being necessary to secure good register and prevent any enlargement of the point-holes or tearing of the paper at the point-holes made through it.

11. Altering the width of the tympan to make it correspond with sheets of various widths or nippers of various length, while the register-points in the meantime are still preserved in their central position.

12. The delivering-bands $w^7$ and $a^8$, and also the delivering-rollers $u^7$, $v^7$, $y^7$, and $z^7$, operating substantially as aforesaid, or mechanical equivalents for either or all of them, in combination with the frisket or any equivalent therefor, the same being for the purpose of receiving a sheet of paper from said frisket and delivering it upon a fly-frame or any other contrivance destined to receive it.

13. The combination of a bellows or other equivalent with the frisket or support of the sheet of paper, and the two series of receiving and delivering endless bands or tapes, the same being arranged and made to operate substantially in manner as specified.

14. The delivering fly-frame or its equivalent, in combination with the delivering-bands $w^7$ and $a^8$, and also with the delivering-rollers $u^7$, $r^7$, $y^7$, and $z^7$, and also with the shaft $e^8$ and the pulleys $b^8$ $b^4$ $b^5$ $b^6$, &c., operating substantially as aforesaid, or any equivalent or equivalents for either or all of them.

15. The employment of the fly or its equivalent for receiving and piling the sheets.

16. The arranging and operating the fly-frame in such manner that its motions may be, in directions perpendicular, or thereabout, to the side of the press, the same enabling me to deposit the imprinted paper in a heap close to or directly by the side of the pressman, and thus afford him the opportunity of more readily examining each sheet after it is printed than he would enjoy if the fly-frame operated in any other direction.

17. The manner set forth of operating the nippers, and which is also exhibited in Figs. 11, 14, 15, 16, 17, 18, 19, 20, 21, 22, and 23, and hereinbefore described.

18. The combination constituting the mechanism employed to convey the printed sheets from the delivering-rollers and bands (or an equivalent) to the pile or table provided to receive them, the same consisting, first, of the delivering fly-frame or a substitute operating substantially the same; second, the mechanism (or a substitute therefor operating substantially the same) employed to give said fly its proper motions and intervals of rest, the same consisting of the cam $z^8$, the lever $a^9$, the rack $b^9$, the pinion $p^8$, and the spring $o^8$; and, third, the devices (or substitutes operating substantially the same) employed for the adjustment and government of the motions of said fly, and its intervals of rest with respect to extent and time, the same being done by making the cam $z^8$, the spring $o^8$, and the fulcrum of the lever $a^9$ adjustable.

19. The manner of constructing and arranging the delivering fly-frame by which it may be depressed below the bands, rollers, and pulleys, by means of which the sheets of paper are successively presented to the action of the said fly in such manner that said fly shall not itself obstruct its reception of the said sheets preparatory to delivering them on the pile.

20. The detached or independent manner of arranging the delivering-bands, pulleys, and rollers, by which I am enabled to give any required velocity to them or any of them, and in that way to govern the time of the final delivery of the sheets successively with reference to the times of action of other parts of the machine, and thus to gain a saving of time which could not be gained were the velocities of said bands, rollers, and pulleys arbitrarily governed by the motion of the frisket or frisket-carriage, or any other part of a flat-surface press, or by the velocity of the cylinder or any other part of a cylinder-press, the same being done by altering the relative diameters of the pulleys $k^8$ and $l^8$, or any equivalent method.

21. The constructing one or more of the distribution-cylinders so as to make it capable of receiving and containing steam or hot or cold water, by which its temperature, as well as that of the ink upon it, and which is to be imparted to the rollers, may be governed.

In witness whereof I have hereto set my signature.

ISAAC ADAMS.

Witnesses:
H. MONTGOMERY,
FRANCIS A. LOVIS.